(12) United States Patent
Holding

(10) Patent No.: US 6,230,855 B1
(45) Date of Patent: May 15, 2001

(54) ELECTRICALLY-OPERATED DISC BRAKE ASSEMBLIES FOR VEHICLES

(75) Inventor: Keith Lawrence Holding, West Midlands (GB)

(73) Assignee: Lucas Industries public limited company (GB)

( * ) Notice: Subject to any disclaimer, the term of this patent is extended or adjusted under 35 U.S.C. 154(b) by 0 days.

(21) Appl. No.: 09/171,251

(22) PCT Filed: Oct. 30, 1996

(86) PCT No.: PCT/GB96/02639

§ 371 Date: Oct. 15, 1998

§ 102(e) Date: Oct. 15, 1998

(87) PCT Pub. No.: WO97/17553

PCT Pub. Date: May 15, 1997

(30) Foreign Application Priority Data

Nov. 4, 1995 (GB) .................................................. 9522631

(51) Int. Cl.[7] ...................................................... B60L 7/00
(52) U.S. Cl. ........................................ 188/158; 74/428.8 R
(58) Field of Search .................................. 188/72.1, 72.8, 188/72.7, 71.9, 162, 158, 161; 310/77, 80; 74/424.7, 424.8 R

(56) References Cited

U.S. PATENT DOCUMENTS

| 3,790,225 | * | 2/1974 | Wehde | 188/162 X |
| 4,085,828 | * | 4/1978 | Thioux | 188/71.6 |
| 4,596,316 | | 6/1986 | Crossman . | |
| 4,836,338 | | 6/1989 | Taig . | |
| 4,865,162 | | 9/1989 | Morris et al. . | |
| 4,926,708 | * | 5/1990 | Dietrich et al. | 74/424.8 C |
| 5,788,023 | * | 8/1998 | Schoner et al. | 188/72.7 |
| 5,829,557 | * | 11/1998 | Halasy-Wimmer et al. | 188/162 |
| 5,915,504 | * | 6/1999 | Doricht | 188/72.1 |
| 5,931,268 | * | 8/1999 | Kingston et al. | 188/162 |
| 6,000,507 | * | 12/1999 | Bohm et al. | 188/158 |

FOREIGN PATENT DOCUMENTS

| 19519310 | * | 11/1996 | (DE) | 188/158 |
| WO 99/14516 | * | 3/1999 | (DE) | 188/158 |
| 0317302 | | 5/1989 | (EP) . | |
| 0743470A1 | | 11/1996 | (EP) . | |
| WO 97/11287 | * | 3/1997 | (GB) | 188/158 |

\* cited by examiner

*Primary Examiner*—Robert J. Oberleitner
*Assistant Examiner*—Pamela J. Rodriguez
(74) *Attorney, Agent, or Firm*—MacMillan, Sobanski & Todd, LLC

(57) ABSTRACT

An electrically-operated disc brake assembly for vehicles is disclosed in which a friction member is adapted to be applied to a rotatable brake disc by a brake-applying apparatus including an electric motor, and transmission in the form of a linear actuator comprising a screw device adapted to apply an axially-directed brake-applying force to the friction member in response to operation of the motor. The screw device comprises inner and outer co-operating screw-threaded members, and one of the members is adapted to co-operate with the armature of the electric motor.

8 Claims, 4 Drawing Sheets

ELECTRICALLY-OPERATED DISC BRAKE ASSEMBLIES FOR VEHICLES

CROSS-REFERENCE TO RELATED APPLICATIONS

This application is the National Stage under 35 U.S.C § 371 of PCT application PCT/GB96/02639, filed Oct. 30, 1996, which designated the United States, and which claimed priority to the Great Britain application 95226321.2, filed Nov. 4, 1995.

This invention relates to improvements in electrically-operated disc brake assemblies for vehicles of the kind in which a friction member is adapted to be applied to a rotatable brake disc by a brake-applying means including an electric motor, and transmission means in the form of a linear actuator comprising a screw device is adapted to apply an axially-directed brake-applying force to the friction member in response to operation of the motor.

A brake of the kind set forth is known from EP-A-0 339 024. In the brake of EP-A-0 339 024 the electric motor is used to drive an input to a reduction gearbox, and the gearbox is adapted to translate the high speed movement of the motor into a controlled high torque output to the screw device.

According to a first aspect, the invention provides an electrically-operated disc brake assembly for vehicles in which a friction member is adapted to be applied to a rotatable brake disc by a brake-applying means including an electric motor and a transmission means in the form of a linear actuator comprising a screw device adapted to apply an axially-directed brake-applying force to the friction member in response to operation of the motor, characterised in that the screw-device comprises inner and outer co-operating screw-threaded members with the outer member comprising the armature of the electric motor.

According to a second aspect, the invention provides an electrically-operated disc brake assembly for vehicles in which a friction member is adapted to be applied to a rotatable brake disc by a brake applying means including an electric motor and a transmission means in the form of a linear actuator comprising a screw fence adapted to apply an axially-directed brake-applying force to the friction member in response to operation of the motor, characterised in that the screw-device comprises inner and outer co-operating screw-threaded members with the inner member co-operating with the armature of the motor, and the armature having an axially sliding coupling with an extension of the inner member.

Since the motor substantially surrounds the linear actuator such a construction has a number of advantages.

The brake is more compact since its overall length is reduced in comparison with other, similar brakes. This improves package size and eliminates installation problems.

The consequential increase in the diameter of the motor changes the characteristics of the motor in such a way that output torque is increased with corresponding decrease in output speed. The increase in motor diameter thereby changes the motor to a low speed high torque motor enabling us to omit a conventional, reduction, gearbox.

Conveniently the linear actuator is of the fine pitch roller screw type and is relied upon to achieve the necessary reduction between the outer screw-threaded member and the inner screw-threaded member.

In one construction the outer screw-threaded member is journalled at opposite ends for rotation on a pair of axially spaced thrust bearings which take the actual thrust on the member when the brake is applied.

In another construction the thrust on the outer screw-threaded member is taken out on a caliper or housing of the brake through a thrust bearing, the member otherwise being journalled for rotation at axially spaced positions.

In another embodiment the linear actuator acts on the friction member through a load spreader or tappet which acts as a heat shield.

When the inner member is rotated by the armature, the outer member which acts on the friction member is keyed against rotation.

Some embodiments of our invention are illustrated in the accompanying drawings in which.

Figure 1:
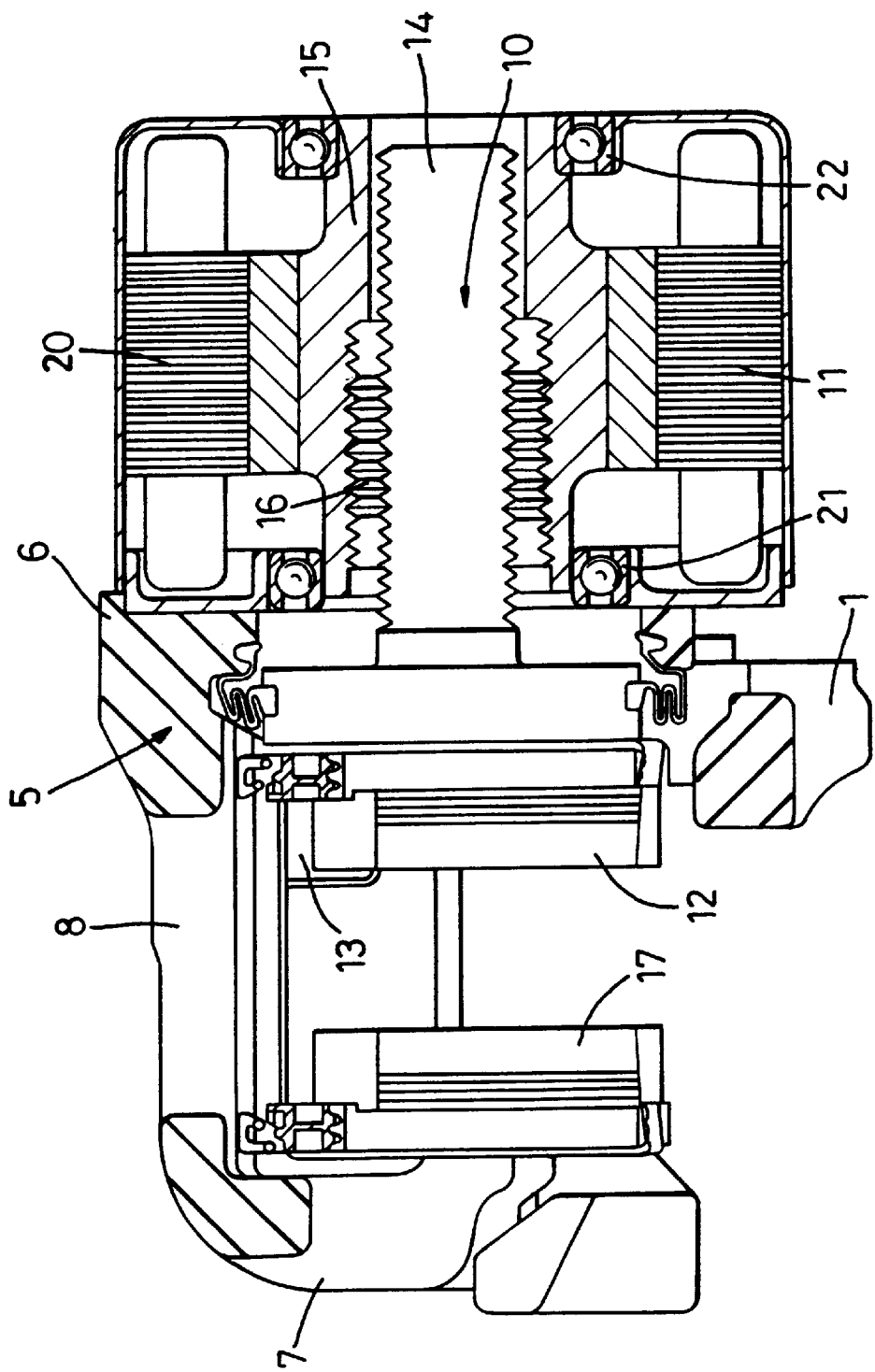
FIG. 1 is a longitudinal section through an electrically-operated disc brake assembly for a vehicle.

The disc brake illustrated in FIG. 1 of the accompanying drawings comprises a stationary brake carrier 1 fixed to a stationary part of the vehicle adjacent to one face of a brake disc (not shown) which is rotatable with the wheel of the vehicle.

A caliper or clamping member 5 of generally U-shaped outline including opposed limbs 6 and 7 interconnected by a bridge piece 8 is slidably mounted on the carrier 1 for movement in an axial direction. The limb 6 houses a brake applying linear actuator 10 in the form of a screw device and an electric motor 11 which substantially encircles the screw device.

A friction member 12 for engagement with an adjacent face of the disc-is mounted between the inner end of the screw device 10 and the disc and is guided for axial sliding movement towards and away from the disc on circumferentially spaced guide surfaces 13 in the limb 6. A friction member 17 for engagement with the opposite face of the disc is carried by the limb 7.

The screw device 10 comprises inner and outer screw-threaded members 14 and 15 with the screw-threaded engagement therebetween being constituted by a recirculating roller screw assembly 16, preferably in the form of a fine pitch re-circulating roller screw, although a plain screw would be satisfactory. The inner threaded member 14 is keyed against rotation, conveniently by a connection to the friction member 12 so that rotation of the outer threaded member 15 causes relative axial movement between the two members 14 and 15 to take place.

The electric motor 11 comprises an annular coil 20 which encircles an armature conveniently constituted by the outer screw-threaded member 15. The armature is journalled for rotation at opposite ends in axially spaced thrust members 21 and 22 which act to prevent movement of the armature 15 in an axial direction with respect to the caliper 5.

In the operation of the brake the electric motor 10 is operated to cause rotation of the armature 15 which, due to the roller screw assembly 16, causes the inner screw-threaded member 14 to act as a thrust member and move axially to apply the friction member 12 to the disc. The reaction of the brake applying force is transmitted back through the outer screw-threaded member 15 and onto the caliper through the bearings 21 and 22. This causes bodily movement of the caliper 5 in the opposite direction, in turn to apply the friction member 17 carried by the limb 7 to the opposite face of the disc.

By the use of a directly operating electric motor 20 and the fine pitch re-circulating roller screw 16 we are able to achieve a velocity ratio of suitable proportion to provide fine control of the brake clamp load.

Figure 2:
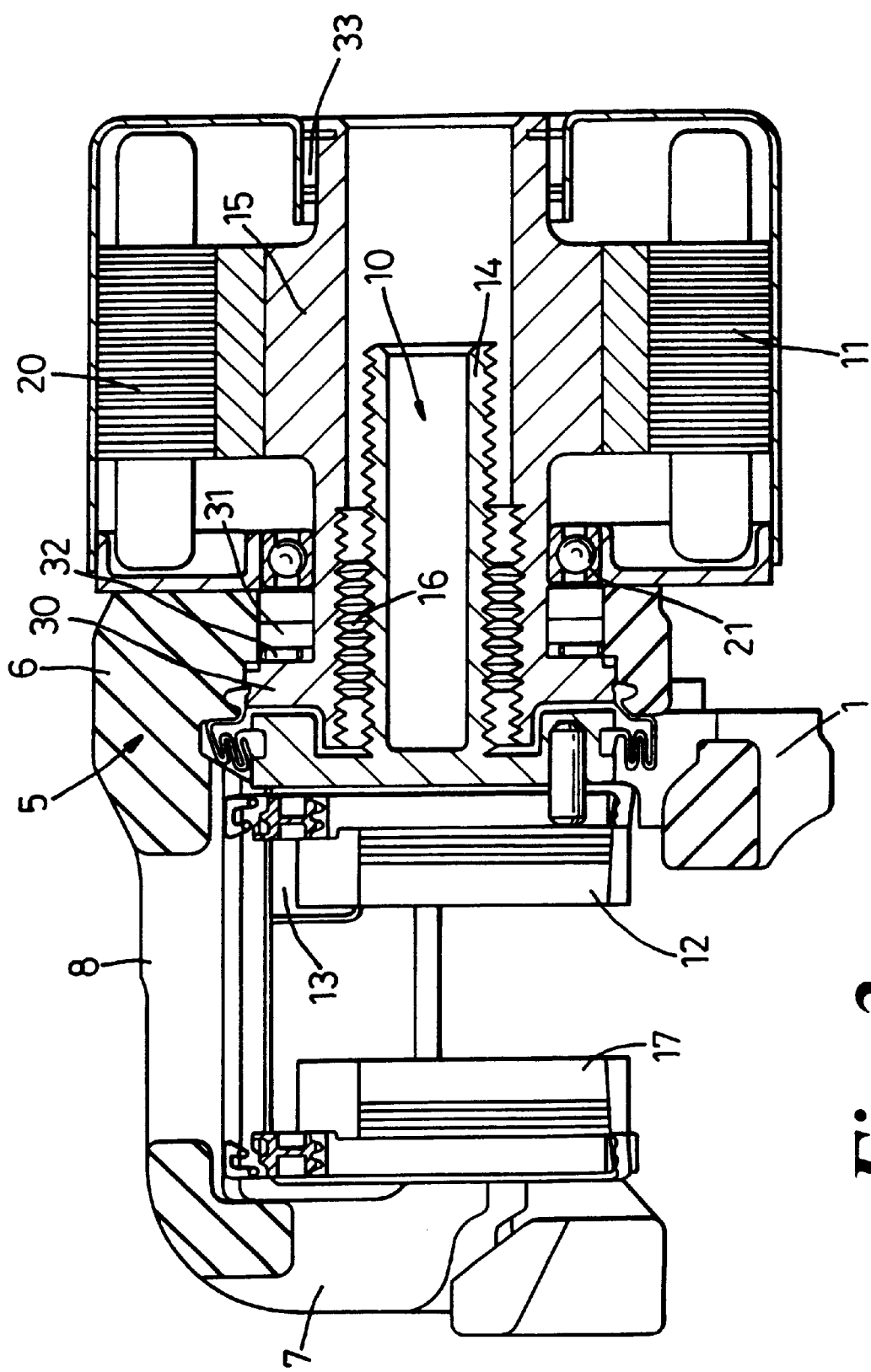
FIG. 2 is a longitudinal section similar to FIG. 1 but showing a modification.

In the brake illustrated in FIG. 2 of the accompanying drawings the outer screw-threaded member 15 is extended inwardly beyond the inner bearing 21 and is provided with a radial flange 30 which cooperates with a thrust taking face 31 on the limb 6 through a thrust bearing 32. The bearing 22 is omitted and is replaced with a bush 33.

The construction and operation of the brake of FIG. 2 is otherwise the same as that of FIG. 1 and corresponding reference numerals have been applied to corresponding parts.

Figure 3:
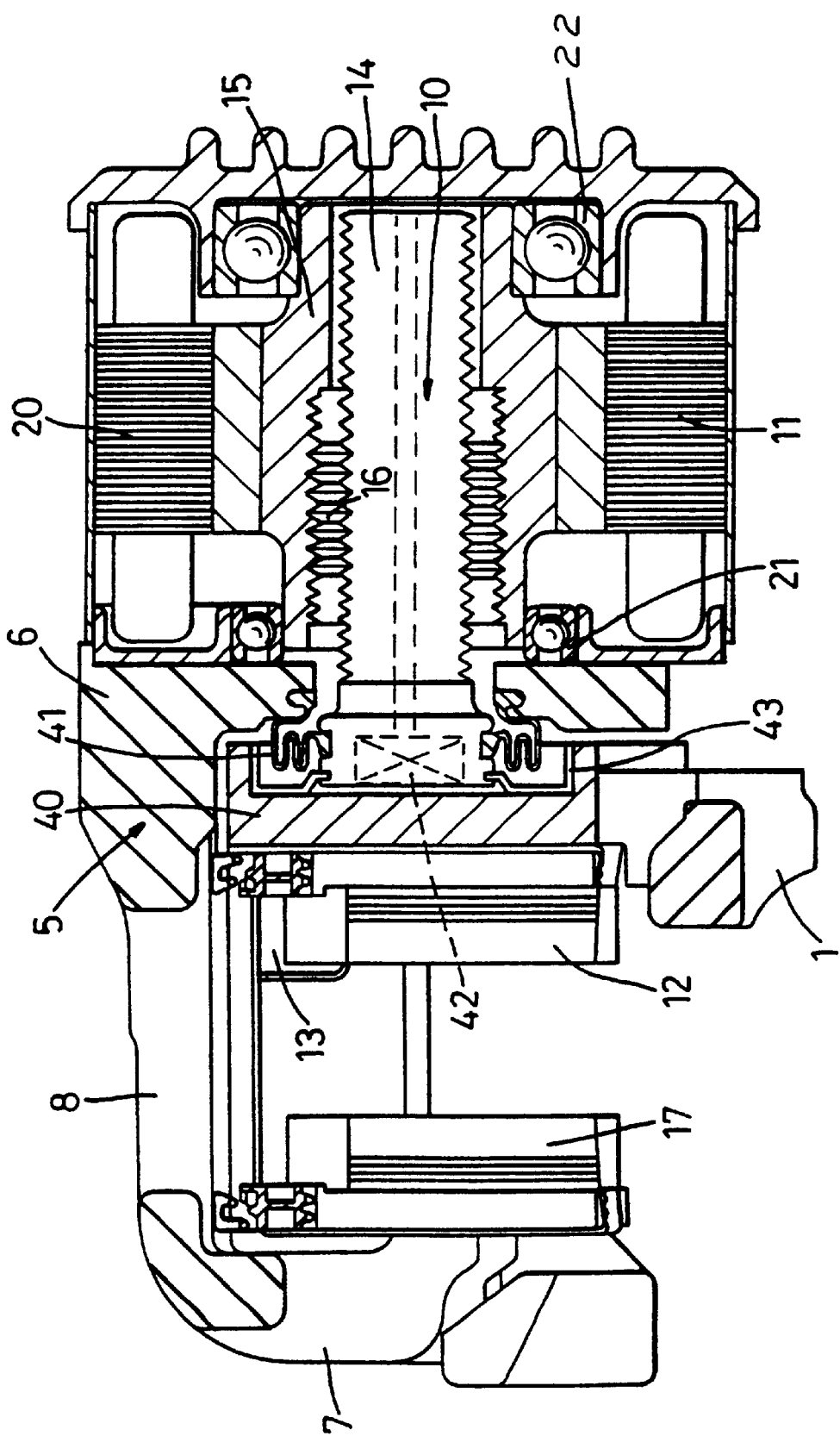
FIG. 3 is a longitudinal section similar to FIG. 1 of another brake.

In the brake illustrated in FIG. 3 of the accompanying drawings, the inner screw-threaded member 14 acts on the friction member 12 through a load spreader or tappet 40 of cup-shaped outline having a recess of greater internal diameter than the external diameter of the complementary end of the screw-threaded member 14. The load spreader or tappet 40 acts to improve the distribution of surface loading on the friction member 12 and acts as a heat shield to protect the motor 10 from temperature variations at the friction interface.

A caliper boot seal 41 is accommodated in an annular space between the screw-threaded member 14 and the adjacent wall of the recess in the spreader or tappet 40.

A load sensor 42 is incorporated to cooperate with inboard face of the spreader or tappet 40.

The spreader or tappet 40 is located or fixed to the screw-threaded member 14 by a thin walled can or diaphragm 43. The can or diaphragm 43 is received in the recess in the spreader or tappet 40 to locate the spreader or tappet 40 with respect to the screw-threaded member 14 but to permit a small amount of relative movement in an axial direction between the screw-threaded member 14 and the spreader or tappet 40 in order to allow the load sensor 42 to receive the full loading on the spreader or tappet 40 as applied by the screw-threaded member 14.

The construction and operation of the brake illustrated in FIG. 3 of the drawings is otherwise the same as that of FIG. 1 and corresponding reference numerals have been applied to corresponding parts.

Figure 4:
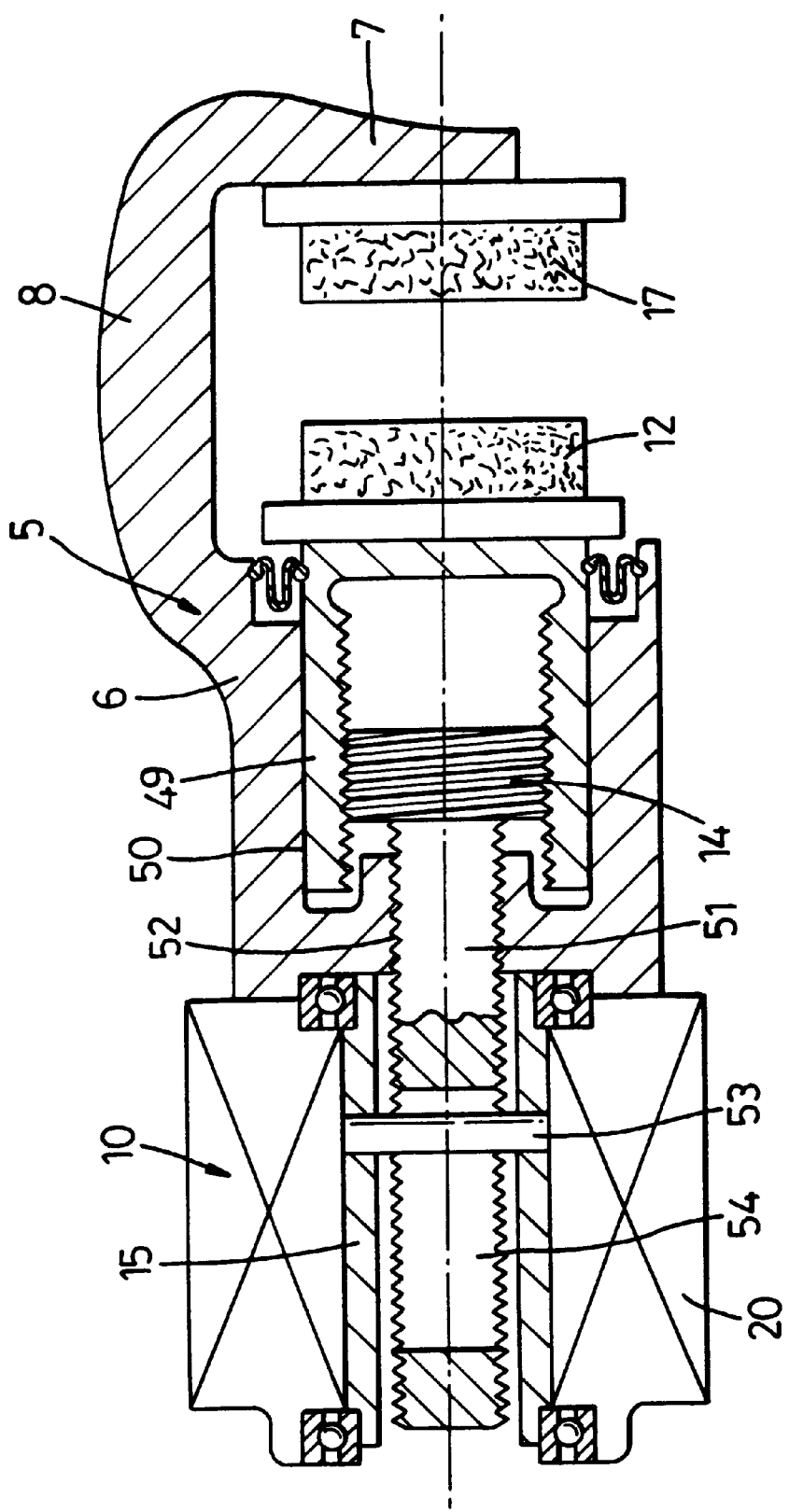
FIG. 4 is a longitudinal section through yet another brake.

In the brake illustrated in FIG. 4 of the accompanying drawings the outer screw-threaded member comprises a piston 49 working in a cylindrical bore 50 in the limb 6 of the caliper 5 and which is keyed against rotation in the bore by a connection or coupling between the closed outer end of the piston 15 and the friction member 12. The inner screw-threaded member 14 is provided with a screw-threaded axial extension 51 which has a screw-threaded engagement in an opening 52 in the adjacent end of the limb 6. The extension 51 extends with a clearance into the armature 15 of the motor 10 which is clamped against the outer end of the limb 6. The armature 15 is keyed to the extension 51 by means of a diametrical drive pin 53 which extends through a longitudinally elongate slot 54 in the extension.

In this construction operation of the electric motor 10 causes rotation of the armature 15 which is accompanied by a corresponding rotation of the inner threaded member 14, in turn causing the piston 49 to advance in the bore 50 at a rate determined by the differences in pitch between the screw-threaded engagement between the extension 51 and the opening 52, and between the external threads on the inner screw-threaded member 14, and internal threads on the outer screw-threaded member 49.

As in the previous embodiments a roller screw assembly may be located between the inner and outer screw-threaded members 14, 49.

What is claimed is:

1. An electrically-operated disc brake assembly for vehicles in which a friction member is adapted to be applied to a rotatable brake disc by a brake-applying means including an electric motor and a transmission means in the form of a linear actuator comprising a screw device adapted to apply an axially-directed brake-applying force to the friction member in response to operation of the motor, wherein the screw-device comprises inner and outer cooperating screw-threaded members, with the outer member comprising the armature of the electric motor, the thrust on the outer screw-threaded member being taken out on a caliper or housing of the brake through a thrust bearing, the outer screw-threaded member otherwise being journalled for rotation at axially spaced positions.

2. A disc brake according to claim 1, in which the linear actuator acts on the friction member through a load spreader or tappet which acts as a heat shield.

3. An electrically-operated disc brake assembly for vehicles in which a friction member is adapted to be applied to a rotatable brake disc by a brake-applying means including an electric motor and a transmission means in the form of a linear actuator comprising a screw device adapted to apply an axially-directed brake-applying force to the friction member in response to operation of the motor, wherein the screw-device comprises inner and outer co-operating screw-threaded members, with the inner member co-operating with the armature of the electric motor, and the armature having an axially sliding coupling with the inner member.

4. A disc brake according to claim 3, in which the linear actuator is of the fine pitch roller screw type.

5. A disc brake according to claim 3, in which the outer screw-threaded member is journalled at opposite ends for rotation on a pair of axially spaced thrust bearings which take the actual thrust on the screw-threaded member when the brake is applied.

6. A disc brake according to claim 3, in which thrust on the outer screw-threaded member is taken out on a caliper or housing of the brake through a thrust bearing, the screw-threaded member otherwise being journalled for rotation at axially spaced positions.

7. A disc brake according to claim 3, in which the linear actuator acts on the friction member through a load spreader or tappet which acts as a heat shield.

8. A disc brake according to claim 3, in which the outer member which acts on the friction member is keyed against rotation.

\* \* \* \* \*